United States Patent

[11] 3,596,110

[72] Inventor Robert E. Hinze
Winnipeg, Manitoba, Canada
[21] Appl. No. 789,253
[22] Filed Jan. 6, 1969
[45] Patented July 27, 1971
[73] Assignee Viscount Electronics Limited
Vancouver, British Columbia, Canada

[54] WIDE BAND SWITCHING CROSSPOINT SYSTEM

2 Claims, 4 Drawing Figs.

[52] U.S. Cl. .......... 307/241, 307/256, 307/243
[51] Int. Cl. .......... H03k 7/00
[50] Field of Search .......... 307/240, 241, 242, 243, 254, 256; 328/213

[56] References Cited
UNITED STATES PATENTS
3,209,164 9/1965 De Witt, Jr. .......... 328/213
3,230,397 1/1966 Linder .......... 307/241
OTHER REFERENCES
" A Survey of Semiconductor Devices and Circuits in Computers" by Velio A. Marsocci, Semiconductor Products Part 2 Jan. 1961 pages 31— 33 copy in 307/203
Millman & Tauby " Pulse and Digital Ckts " McGraw Hill, 1956 TK 7835-M55, page 435

*Primary Examiner*—John S Heyman
*Assistant Examiner*—B. P. Davis
*Attorney*—Jessup and Beecher

ABSTRACT: Electronic switching circuitry is provided for particular use in a cross-point switching system and which is capable of switching wide band signals, such as television signals, computer data signals, telemetry signals, and the like, between multiple input and output channels, and of achieving the switching operations with a minimum of crosstalk between the channels, and with maximum signal-to-noise ratio throughout the switching system. Although the switching circuitry of the invention will be described herein in conjunction with such a cross-point switching system, it will be appreciated as the description proceeds, that it has general applications, for switching signals extending, for example, from 0—40 mHz. in frequency, and wherever high signal-to-noise ratio is desired with a minimum of interchannel crosstalk.

INVENTOR:
Robert E. Hinze
Jenny and Beecher
By Keith D. Beecher
ATTORNEYS

INVENTOR:
Robert E. Hinze
Jessup and Beecher
By Keith A. Beecher
ATTORNEYS

WIDE BAND SWITCHING CROSSPOINT SYSTEM

BACKGROUND OF THE INVENTION

In the usual cross-point switching system of the prior art, a plurality of input lines are provided which correspond to different signal channels, and these input lines are selectively switched to a multiplicity of output lines. When the input lines of such a prior art switching system carry wide band high frequency signals, for example, of the type mentioned above, and diode and transistor switches are usually provided at each cross-point between the input and output lines.

However, crosstalk problems have arisen in the past, especially at the higher frequencies, and particularly where a relatively large number of input and output lines are to be selectively switched. The circuitry and system of the present invention are constructed to reduce materially the cross talk in the individual channels, and also to minimize the stray current flow throughout the system so as to improve the overall signal-to-noise ratio thereof.

DETAILED DESCRIPTION OF THE ILLUSTRATED EMBODIMENT

Figure 1:
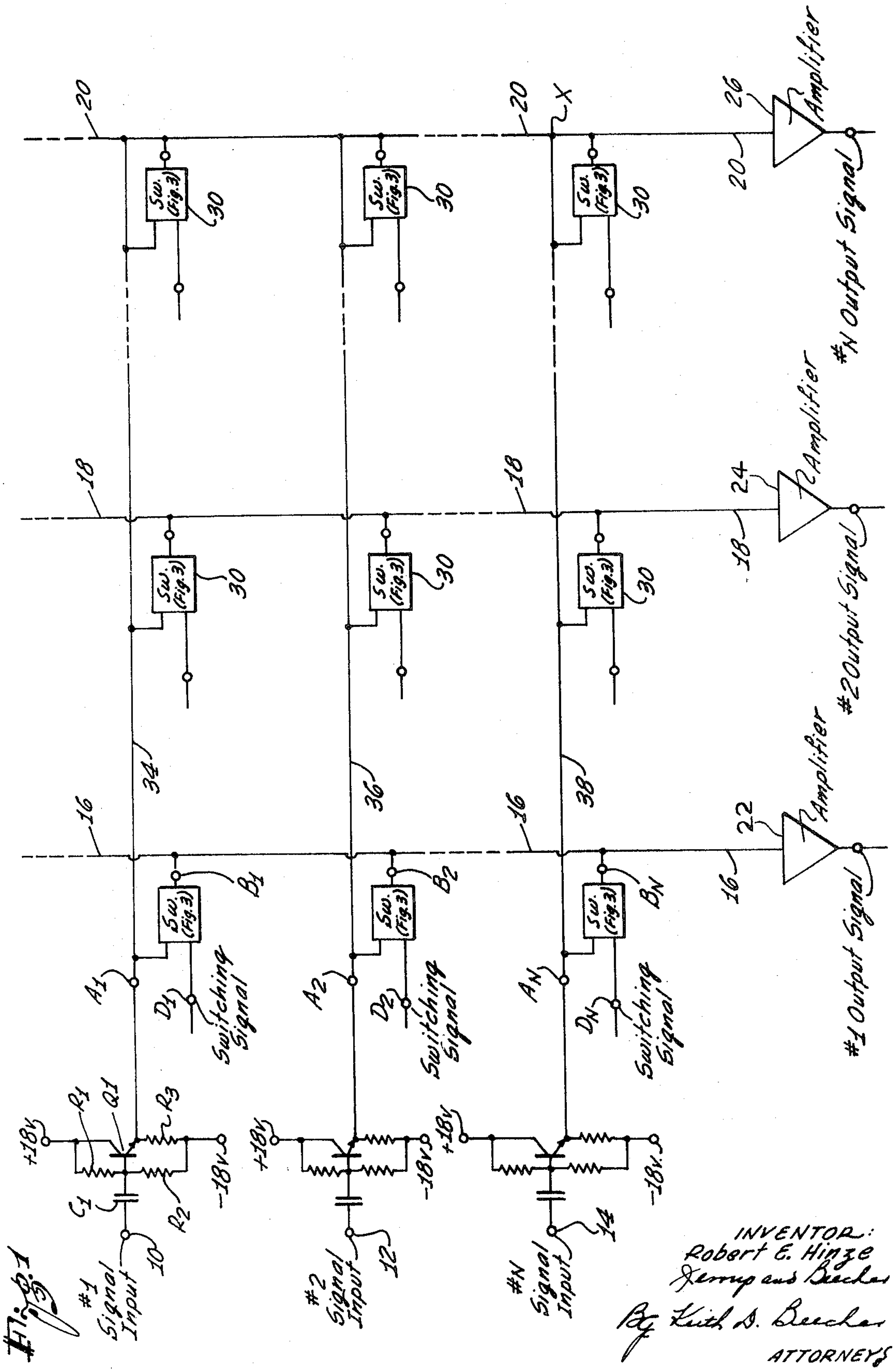
FIG. 1 is a schematic diagram, partly in circuit form and partly in block form, illustrative of a typical cross-point switching system.

As shown in FIG. 1, for example, N signal input lines may be provided, of which three are illustrated. The 01 signal input, for example, is introduced to an input terminal 10, the 02 signal input, for example, is introduced to an input terminal 12, whereas the 0N signal input is introduced to an input terminal 14. The input terminals 10, 12 and 14 are connected to the corresponding input lines, and the function of the cross-point switching system of FIG. 1 is selectively to switch the input lines 10, 12 and 14 to output lines, such as the illustrated lines 16, 18 and 20. The output line 16, for example, is connected to an output amplifier 22, which supplies a 01 output signal to a 01 output channel. The output line 18 is connected to an output amplifier 24, which supplies a 02 output signal to the 02 output channel. The output line 20, for example, is connected to an output amplifier 26, which supplies the 0N output signal to a 0N output channel.

It will be understood, of course, that any number of input lines may be provided, and that the input lines may be selectively switched to any number of output lines. At each cross-point, a switch designated 30 is provided. This switch, in the prior art, typically has the circuit configuration shown in FIG. 2. However, in accordance with the concepts of the present invention, the switch 30 has the circuit configuration shown in FIG. 3.

In the switching system of FIG. 1, the input terminals 10, 12 and 14 are connected to emitter follower transistor circuits which may be similar to one another. For example, the input terminal 10 is connected through a coupling capacitor $C_1$ to the base of an NPN transistor $Q_1$. The collector of the transistor $Q_1$ is directly connected to the positive terminal of an 18-volt direct voltage source, for example. The emitter of the transistor $Q_1$ is connected through a resistor $R_3$ to the negative terminal of the 18-volt direct voltage source. A pair of resistors $R_1$ and $R_2$ are connected across the 18-volt direct voltage source, and the common junction of these resistors is connected to the base of the transistor $Q_1$ to provide a bias potential to the transistor. The emitter of the transistor $Q_1$ is connected to a terminal $A_1$ of an input line 34.

A similar emitter follower transistor circuit couples the input terminal 12 to an input line 36, and a further similar cathode follower circuit connects the input terminal 14 to a further input line 38. It will be appreciated that switching circuits are provided so that the input line 34 may be selectively connected to any of the output lines, such as the output lines 16, 18 and 20; and that other switching circuits, as illustrated, are provided so that the input lines 36 and 38 may also be selectively switched to any of the output lines 16, 18 or 20.

Figure 2:
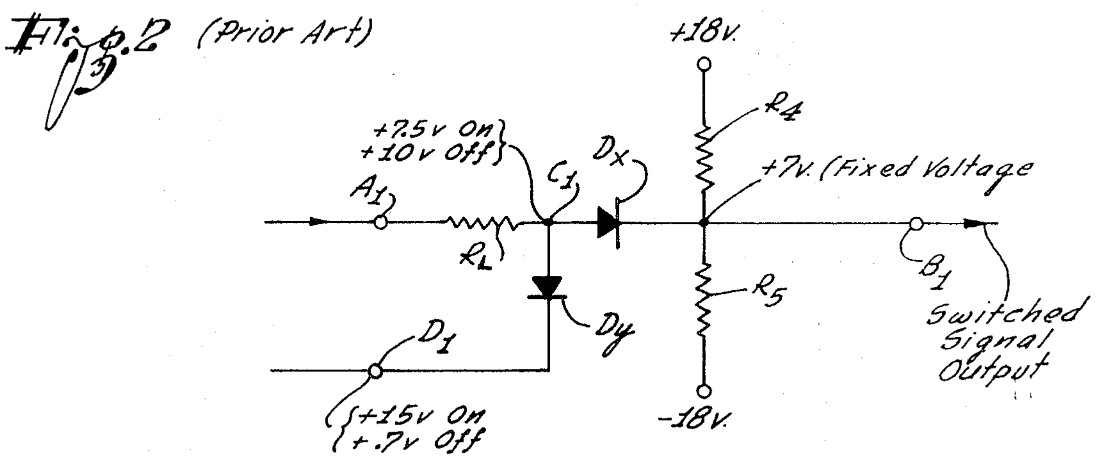
FIG. 2 is a circuit representation of a prior art diode switching circuit.

A typical prior art switching circuit 30 is shown in FIG. 2. In that circuit the input terminal $A_1$ is connected through a load resistor $R_L$ to the anodes of a pair of diodes $D_y$ and $D_X$. The cathode of these diodes $D_X$ is connected to the junction of a pair of resistors $R_4$ and $R_5$ which are connected across the aforesaid 18-volt source, the common junction also being connected to the output terminal $B_1$ of the switching circuit. The common junction of the resistor $R_L$ and the anodes of the diodes $D_X$ and $D_Y$ is designated $C_1$ in FIG. 2. A switching signal is applied, for example, to an input terminal $D_1$ of the prior art switching circuit of FIG. 2.

Figures 3, 4:
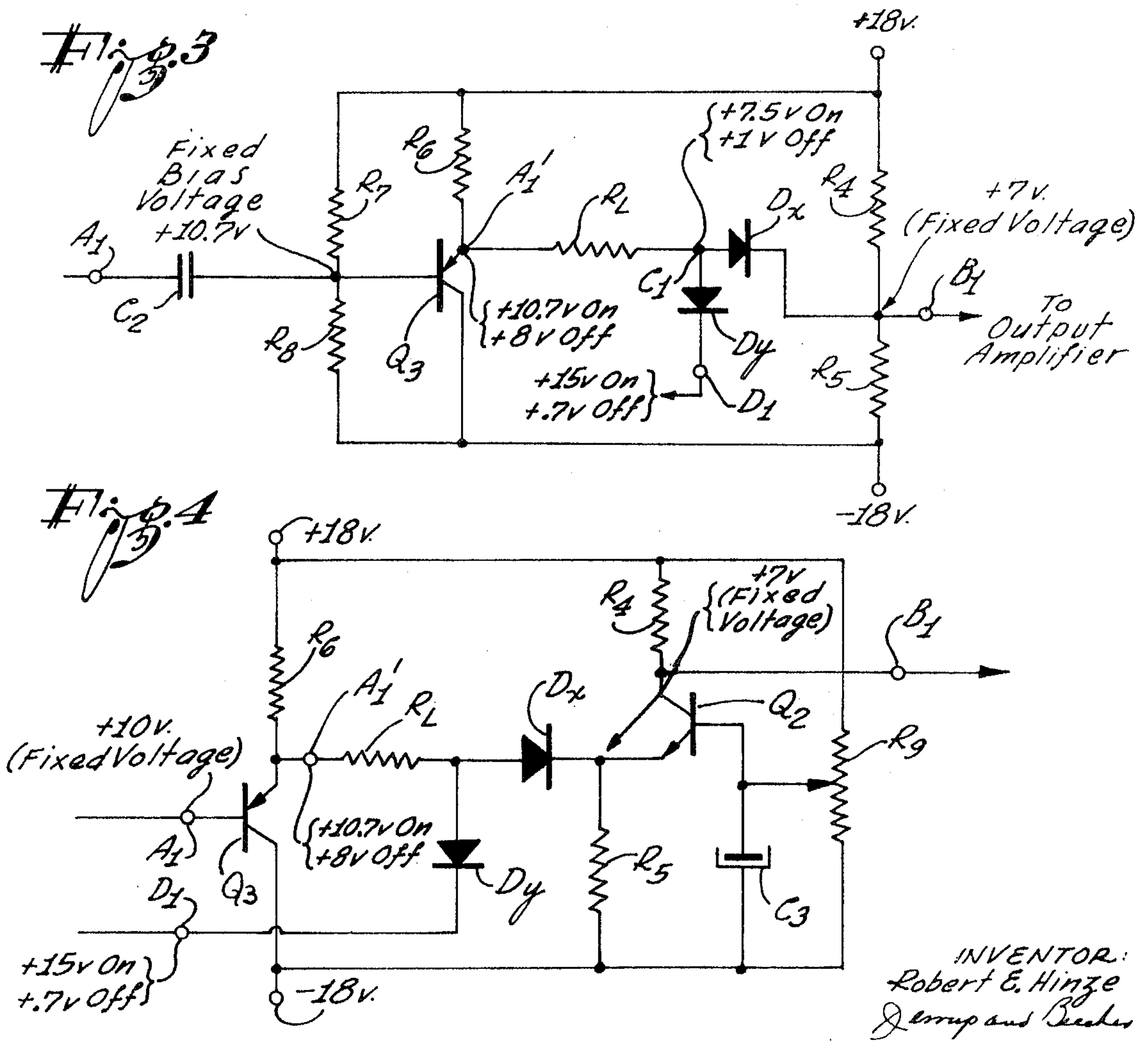
FIG. 3 is a circuit representation of a switching circuit constructed in accordance with the concepts of the present invention, and which is intended to replace the prior art switching circuit of FIG. 2.
FIG. 4 is a commercial embodiment of the switching circuit of FIG. 3.

It will be understood, of course, that identical performance of the circuit of FIG. 2, as well as the circuit of FIG. 3, may be achieved by reversing the diode and power supply polarity, as well as by reversing the transistors from NPN to PNP and vice versa.

Therefore, when the usual prior art switching circuit of FIG. 2 is used, a signal from the 01 signal input in FIG. 1, for example, proceeds from the input terminal 10 and through the emitter follower circuit of the transistor $Q_1$. The signal then proceeds to the point $A_1$ which provides a point of entry to all of the switching circuits 30 connected to the particular input line 34. The emitter follower circuit of the transistor $Q_1$ serves to hold the potential of the point $A_1$ at a nearly constant value. Since the emitter follower circuit of the transistor $Q_1$, as well as the other emitter follower circuits associated with the input terminals 12 and 14, must deliver signals to the corresponding lines 34, 36 and 38 at all times, these emitter follower circuits are always in an energized signal conductive condition.

When the point $D_1$ is placed at a high positive potential, for example, of the order of +15 volts, the diode $D_Y$ is reverse biased, and is for all purposes out of the circuit. The diode $D_X$ then becomes forward biased, due to the potential existing between the points $A_l$ and $B_1$. Therefore, when the switching signal applied to the terminal $D_1$ is raised to the aforesaid high positive value, the input signal from the line 34 is permitted to flow through the switch to the corresponding output line through the output terminal $B_1$.

To turn the switching circuit of FIG. 2 to an "off" condition, the switching signal applied to the input terminal $D_1$ is reduced in potential to a value near ground potential, for example, of the order of 0.7 volts. Current will now flow from the terminal $A_1$ through the resistor $R_L$ and through the diode $D_Y$, since the diode $D_Y$ is now forward biased, and the potential at the point $C_1$ will be lowered from around +7.5 volts to about +1 volt. This reduction of potential at the point $C_1$ causes the diode $D_X$ to become reverse biased, so that the signal flow to the output terminal $B_1$ is considerably reduced.

Since the impedance of the forward biased diode $D_Y$ is not zero, and since the impedance of the diode $D_X$ is not infinite, the internal capacity of the diode $D_X$ will permit signal flow to the output terminal $B_1$ even though the switching circuit of FIG. 2 is in its "off" condition. This leakage characteristic is especially troublesome at frequencies about 10 mHz.

Moreover, when the prior art switching circuit of FIG. 2 is placed in its "off" condition by causing the diode $D_Y$ to be forward biased, a loading effect is placed on the input terminal $A_1$ due to the reduced input impedance of the circuit. This places an increased load on the emitter follower circuit of the transistor $Q_1$ in FIG. 1, for example. Therefore, each time a prior art switching circuit is switched to its "off" condition, the correspondingly increased load placed on its emitter follower increases the stray energy fed to the power lines and return ground lines, correspondingly decreasing the signal-to-noise ratio of the overall system mHz Although the conditions discussed in the previous paragraph may be tolerated in switching systems where relatively small numbers of input and output lines are involved, the problems become serious in the larger systems For example, a cross-point switching system with 20 input lines and 50 output lines has 1000 cross-points. When all the output lines are placed in operation, 50 cross-points would represent a normal loading, but the remaining 950 cross-points will cause the increase in stray current flow into the power supplies and other common circuits, so that the combined effect of all the switching circuits in the "off" condition becomes most objectionable. This is particularly troublesome at the high frequencies, such as 20 mHz. and higher.

The improved switching circuitry of the present invention, as mentioned above, serves to improve materially the cross talk figure of each cross-point in the system, and also tends to reduce materially the effect of the "switched off" cross-points insofar as stray current flow in the system, with corresponding reduced signal-to-noise ratio, is concerned. This is achieved, for example, by providing a transistor input circuit for the switching circuitry in which the transistor is driven to its nonconductive state, when the switching circuitry exhibits an increased loading effect, so that the increased loading effect is not reflected through the rest of the system.

In the embodiment of FIG. 3, for example, a PNP transistor $Q_3$ is interposed between the input terminal $A_1$ of the switching circuit and the load resistance $R_L$. This transistor has its collector connected to the negative terminal of the 18–volt direct voltage source, and has its emitter connected through a resistor $R_6$ to the positive terminal of the 18–volt source, as well as to the load resistor $R_L$.

Bias voltage for the transistor $Q_3$ may be provided by the potential divider resistors $R_7$ and $R_8$. This bias voltage, for example, may have a fixed value of +10.7 volts. Signals may be applied through the capacitor $C_2$ from the input terminal $A_1$.

It will become evident as the description proceeds that the circuit of the transistor $Q_3$ may be replaced by an equivalent circuit incorporating a field effect transistor, or other appropriate equivalent circuit may be used.

The operation of the circuit of FIG. 3 will be described subsequently in conjunction with the circuit of FIG. 4. The circuit of FIG. 4 is similar to that of FIG. 3, and like components have been designated by the same numerals. However, the circuit of FIG. 4 includes certain known control circuits to provide manual adjustment capabilities to the circuit.

For example, an NPN transistor $Q_2$ is interposed between the resistors $R_4$ and $R_5$ in the circuit of FIG. 4, so as to provide an appropriate amplitude control for the signal passed through the switching circuit. The transistor $Q_2$ has its emitter connected to the resistor $R_5$, and its collector connected to the resistor $R_4$ and to the output terminal $B_1$. The base of the transistor $Q_2$ is connected to a capacitor $C_3$ which is connected to the negative terminal of the 18–volt source. The base of the transistor $Q_2$ is also connected to the movable contact of a potentiometer $R_9$ connected across the 18–volt direct voltage source. The circuit of transistor $Q_2$ is a common-base emitter input circuit, which is a wide-band circuit with no signal inversion. The resistor $R_9$ is adjusted to provide +7 volts at the emitter of the transistor $Q_2$. Under given conditions, this will place the signal on the linear portion of the transfer curve. (If the value of the resistor $R_9$ is too high, high side of the output waveform will be compressed or clipped; if the value of the resistor $R_9$ is too low, low side of the output waveform will be clipped.) Adjustment of the resistor $R_9$ has very little effect on the amplitude of the signal.

To turn the circuits of FIGS. 3 and 4 to their "off" condition, the voltage applied to the terminal $D_1$ is reduced to near ground potential, that is, to approximately 0.7 volts, for example. This causes the potential of the point $C_1$ to be lowered to approximately 1 volt, as in the circuit of FIG. 2. The potential of the point $B_1$ is held constant at 7 volts, for example, as in the previous circuit, so that the diode $D_X$ is reverse biased. The value of the load resistor $R_L$ is made sufficiently low so that when the diode $D_Y$ is forward biased, the emitter potential of the transistor $Q_3$ at the point $A'_1$, for example, is reduced to a value of for example, 8 volts Since the base of the transistor $Q_3$ is held at 10 volts, the transistor becomes nonconductive.

The inclusion of the transistor $Q_3$ in the circuit of FIG. 3 and 4 reduces crosstalk materially, since leakage through the switching circuit is reduced by the internal impedance of the transistor $Q_3$ resulting, for example, in an increase of "on" to "off" ratio of the order of 25 to 30 db. Also, the inclusion of the circuit of the transistor $Q_3$ in the switching circuit further results in minimizing the loading effect of the diode $D_4$ on the switching system when the diode is placed in its conductive state, since the transistor $Q_3$, under such conditions, is rendered nonconductive, so that stray current flow into the other power supplies and into the common circuitry of the system is virtually eliminated.

The invention provides, therefore, an improved switching circuit for use, for example, in a cross-point switching system, whereby crosstalk between inputs is materially reduced, and the injection of stray signals into the power supplies and other common parts of the system, likewise, is materially reduced for improved signal-to-noise ratio in the system.

The inclusion of the improved switching circuit of the present invention, for example, in a cross-point switching system permits larger systems to be constructed which are capable of handling a large number of separate input lines; and of selectively switching the input lines to a relatively large number of output lines, with a minimum of crosstalk, and with stray currents through the overall system being virtually eliminated.

What I claim is:

1. A wide band high frequency switching circuit including: an input terminal; transistor means having a base electrode coupled to said input terminal, and having emitter and collector electrodes connected across a direct current voltage source, first circuit means connected across said voltage source for establishing said base electrode at a fixed direct current bias voltage, first resistor means directly connected to said emitter electrode and to one terminal of said direct current voltage source and interposed between said emitter electrode and said one terminal of said direct current voltage source; load resistor means directly connected to the junction of said first resistor means and to said emitter electrode; an output terminal; second circuit means connected across said direct current voltage source and to said output terminal for establishing said output terminal at a particular direct current voltage threshold lower than the aforesaid fixed direct current bias voltage; first diode means connected to said load resistor means and to said output terminal; and second diode means connected to the junction of said load resistor means and first diode means and to a source of switching potential; said switching potential selectively providing a direct current potential higher than the aforesaid direct current voltage threshold to reverse bias said second diode means and permit alternating current signals applied to said input terminal to flow through said transistor means, through said load resistor means and through said first diode means to said output terminal, and said switching potential source selectively providing a relatively low direct current voltage with respect to the aforesaid direct current voltage level to forward bias said second diode means and to cause said first diode means to become reverse biased, thereby to block the flow of alternating current signals from said input terminal to said output terminal, the forward biasing of said second diode means providing a direct current flow through said load resistor means thereby reducing the direct current potential on said emitter electrode of said transistor means to a value at which said transistor means is rendered nonconductive thereby to provide an increased input impedance for said switching circuit, as compared with the input impedance thereof when said second diode means is nonconductive.

2. The combination defined in claim 1, in which said second circuit means includes a transistor circuit and adjustable potentiometer means for controlling the amplitude of the alternating current signals passed through said switching circuit.